July 26, 1966
E. K. KARLSSON ETAL
3,262,255
ROTARY STRIPPER PLATES
Filed April 9, 1964
2 Sheets-Sheet 1
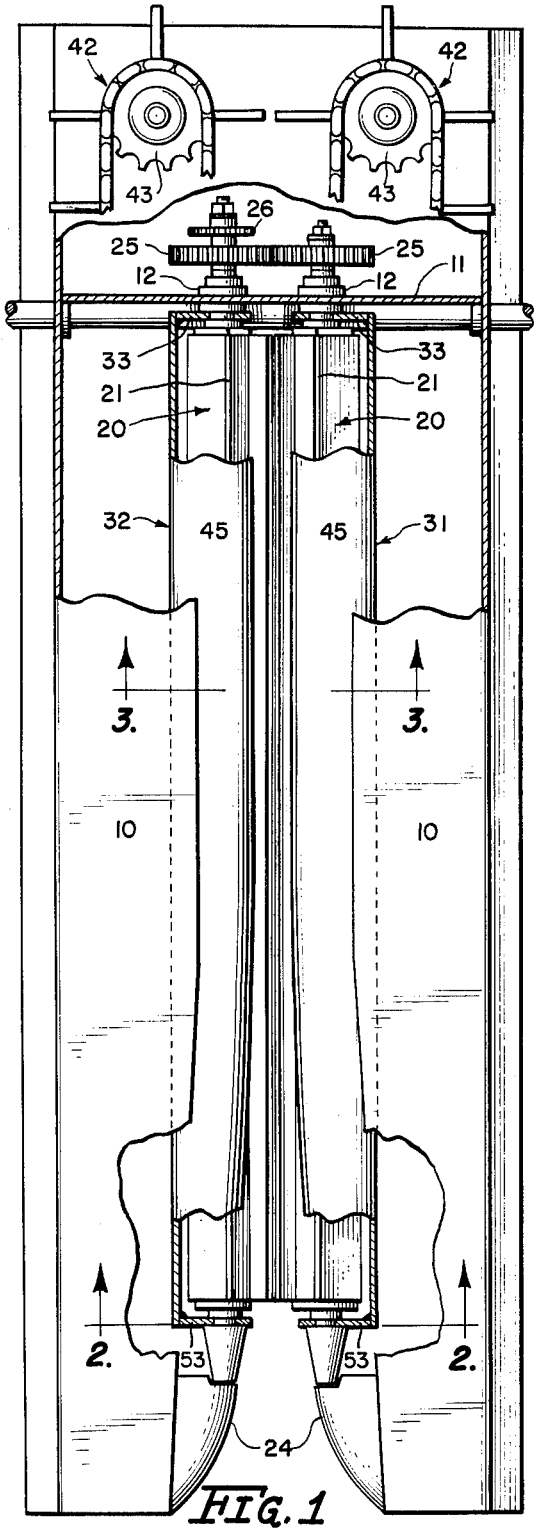
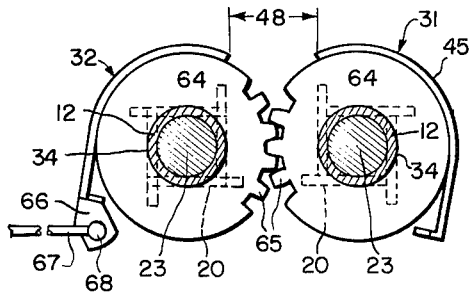
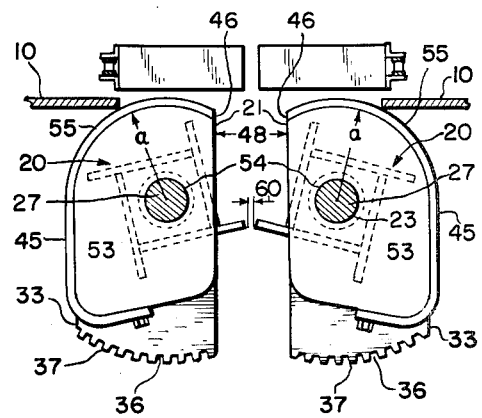
INVENTOR.
Ralph L. Sutton
Elof K. Karlsson July 26, 1966  E. K. KARLSSON ETAL  3,262,255
ROTARY STRIPPER PLATES
Filed April 9, 1964  2 Sheets-Sheet 2
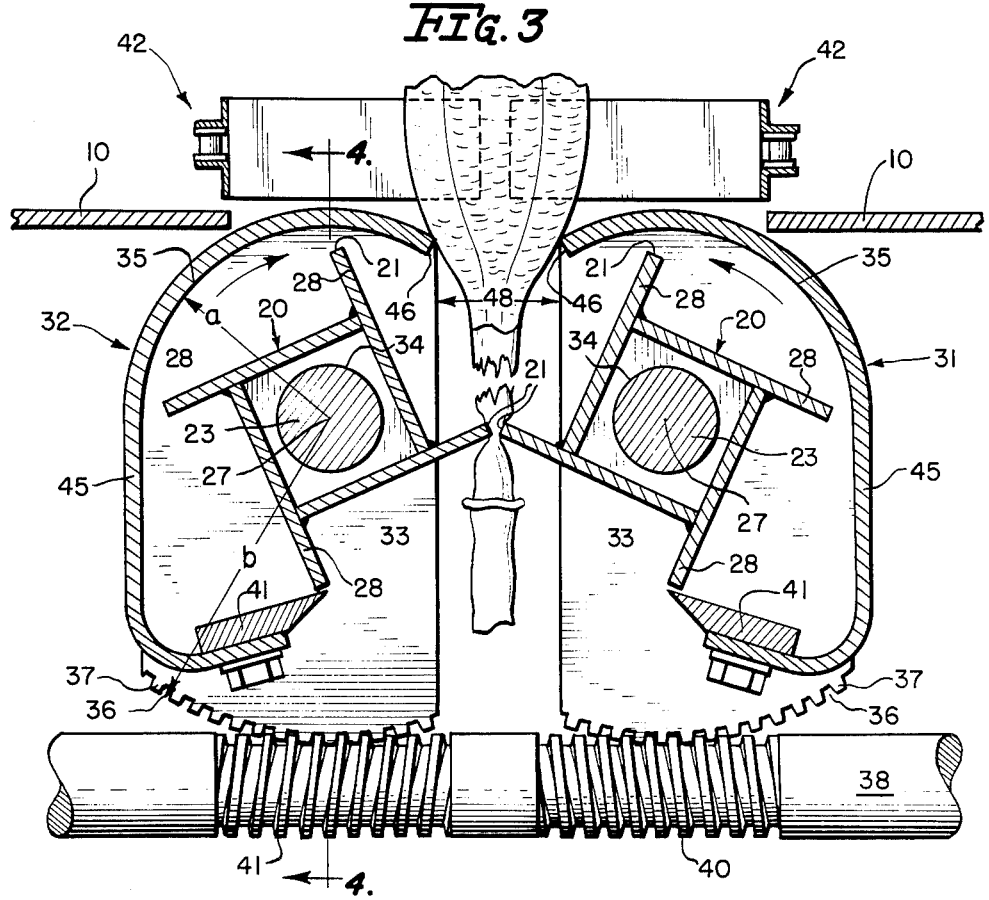
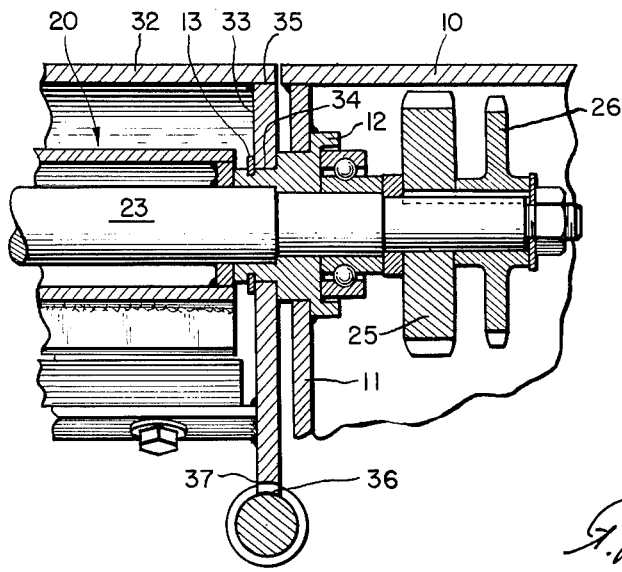
INVENTOR.
Ralph L. Sutton
Elof K. Karlsson

United States Patent Office 3,262,255
Patented July 26, 1966

3,262,255
ROTARY STRIPPER PLATES
Elof K. Karlsson, East Moline, and Ralph L. Sutton, Rock Island, Ill., assignors to International Harvester Company, Chicago, Ill., a corporation of New Jersey
Filed Apr. 9, 1964, Ser. No. 358,534
8 Claims. (Cl. 56—107)

This invention is directed to a novel corn harvesting apparatus and more particularly to an apparatus which includes adjustable stripper plates that will enable the ear of corn to be stripped from the stalk with a minimum of stalk remaining on the ear, and will permit easier removal of the husk.

As a corn picking or harvesting machine is directed through the field of standing corn, the first operation which must be performed is the picking or removal of the ears of corn from the stalks. For many years the initial separation of the ears from the stalks was accomplished by providing a pair of generally-cylindrical snapping rolls aligned parallel to each other and rotated in opposite directions. Such rolls have been generally positioned in inclined fashion extending downwardly and forwardly to a position near the ground plane.

The direction of rotation of such rolls is such that the peripheral portion of each roll is moving downwardly as such portion passes adjacent the other roll. Thus, as the corn picking apparatus proceeds along the row; the lower portion of each stalk passes between the pair of rolls at the forward portion thereof. The rolls are provided with aggressive surfaces to grasp the stalks and in effect pull them downwardly between the pairs of rolls.

The pair of snapping rolls have been produced with a variety of different surface configurations to offer a more or less aggressive surface to the stalk. As the rolls were made more aggressive to effect more positive feeding of the stalks therethrough there was likewise produced a corresponding tendency to grab the butt of the ear and effect some shelling or bruising of the ear by the stripping rolls.

In an attempt to minimize the shelling and thus to correspondingly reduce the waste at the stripping rolls, stripper plates were positioned over and substantially parallel to the snapping rolls. These stripper plates were essentially a pair of flat plates spaced apart to define therebetween a material-feeding slot, the lateral extent of which was usually fixed inasmuch as each of the stripper plates was supported in a fixed position. (See the patent to Bulfeur No. 2,700,858, issued on February 1, 1955). Occasionally an adjustment for the position of one of the stripper plates has been provided, but it was necessary to make such adjustments with the equipment de-energized so that there was always a constant lateral extent of the material-feeding slot when the equipment was operating. A device such as this is disclosed in the patent to Fergason No. 2,542,646 that issued on February 20, 1951. A still further development in stripper plates is disclosed in the patent to Karlsson et al. 3,101,579 of August 27, 1963 wherein the stripper plates can be symmetrically adjusted by the operator from the operator's platform during the operation of the harvesting machine. The spacing of the stripper plates is such as to allow a stalk to easily pass through the slot to be gripped by the snapping rolls, but the slot is sufficiently narrow so that the ears of corn could not pass therebetween. Although such a construction has the desirable result of reducing the amount of shelling at the point where the ear is separated from the stalk, nevertheless in certain conditions such as the encountering of great numbers of broken or down stalks, many stalks do not enter the material-feeding slot and the entire stalk is fed into the combine thereby overloading the ancillary cleaning devices on the equipment to the extent that continued picking is not possible. An advancement in stripper plates that overcomes this disadvantage is disclosed in the patent to Keller et al. No. 3,126,690 of March 31, 1964 filed on February 26, 1962 wherein a single oscillating stripper plate is disclosed which functions to cyclically vary the effective lateral extent of the material-feeding slot and thereby process more down or broken stalks that might otherwise be missed.

The subject invention is particularly adaptable for use with corn snapping rolls of the type disclosed in the patent to Karlsson et al. No. 3,139,887 of July 7, 1964, filed on September 26, 1962. The snapping rolls disclosed in said Karlsson et al. patent include a core having plates or strips secured to each face of the core and extending outwardly therefrom. The outwardly-extending working edges of the plates or strips are scalloped and a pair of rolls are oriented with respect to each other such that the working edges of the plates or strips approach each other when the rolls are rotated. Snapping rolls of this type enable the stalks to be guided between the working edges of the rolls at a point close to the stripper plates. For a more detailed disclosure of this type of snapping rolls reference may be made to the above-referred-to patent.

One of the goals designers of corn-harvesting equipment are steadily striving for is a machine that can effectively harvest the crop while moving at greater ground speeds. It is obvious that the less trash initially fed into the machine the greater will be the amount of harvested grain that can be produced by the machine. All the above-mentioned improvements are directed at least in part to the problem of reducing the initial amount of trash fed into the machine. Each of these patents disclose important steps in the development of corn-harvesting machines, and the present invention involves another significant advancement in this art. By using the present invention, the stripped ear has less remaining stalk and the husk is easier to remove than ears stripped by previous methods. Most ears stripped by the invention disclosed herein will be separated from the stalks along the lobe of the ear which is the short stem extending outwardly from the heel of the ear. The lobe is of a smaller diameter than the stalk and since it is short the piece remaining on the ear is very short and thus the initial trash fed into the harvesting machine is reduced considerably.

Another advantage obtained in this invention is that by breaking the ear from the stalk along the lobe the husks are more easily removed from the ear. The husks are connected to the ear in the area of the lobe and by severing the ear in this area the connection is broken and the husks are easier to remove.

To attain these desirable results, the present invention contemplates a unique stripper plate construction that is curved about the axis of the cooperating snapping roll and enables the butt of the ear of corn to be located closer to the snapping rolls. Means are provided to simultaneously rotate the stripper plates in equal increments to adjust the material-feeding slot therebetween such that they will always be symmetrically located with respect to the slot between the snapping rolls. The stripper plates disclosed herein are used in combination with a particular type of snapping rolls which will permit the stalks and the lobes to be gripped by the snapping rolls closer to the stripper plates. This cooperation between the stripper plates and snapping rolls further enhances the overall efficiency of applicants' device.

An object of the present invention is the provision of stripping plates that will permit the ear to be contacted by the stripper rolls at a point adjacent the heel of the ear.

Another object is to provide a combination of stripper plates and rolls that will remove the ear from the stalks with a minimum of trash.

A further object of the present invention is the provision of stripping mechanisms that will sever the ear from the stalk between the heel of the ear and the first node on the lobe.

Still another object is to provide stripping means that will sever the ear from the stalk along the lobe to permit easy removal of the husk.

These and other objects of the invention will become more apparent from the specification and drawings wherein:

FIGURE 1 discloses a plan view of the corn picking apparatus having portions on the gathering sheet and gathering chains broken away;

FIGURE 2 is a cross-sectional view taken along lines 2—2 of FIGURE 1;

FIGURE 3 is a cross-sectional view taken along lines 3—3 of FIGURE 1;

FIGURE 4 is a cross-sectional view taken along lines 4—4 of FIGURE 3; and

FIGURE 5 is an end view of an additional embodiment of the stripper plates and the operating mechanism.

Referring now to the drawings wherein the corn-picking apparatus including an upper gathering sheet 10 having a support bracket 11 secured thereto, is shown. As shall be described in greater detail, the corn-feeding rolls 20 are mounted for rotary movement on the corn-picking apparatus and the stripper plates 31 and 32 are mounted for rotary movement about the axes of the feeding rolls 20.

As can be best seen in FIGURES 1 and 4, the support bracket 11 is secured to the gathering sheet 10 and carries a pair of bushings 12 that are adapted to support the generally cylindrical corn-feeding rolls 20 and the stripper plates 31 and 32. A pair of point arrangements 24 are mounted on the other end of the gathering sheet 10 and are adapted to support the other ends of the feeding rolls 20 and stripper plates 31 and 32. A pair of gathering chains 42 driven by sprockets 43 are located above the gathering sheet 10 and function to transport the ears of corn up the corn-picking apparatus. Since the gathering chains 42 are not part of applicants' invention, and are conventional elements of corn-picking apparatus a detailed description is not considered necessary. For a detailed description of the gathering chains reference may be made to the above-referred-to Fergason Patent No. 2,542,646.

The stalk feeding rolls 20 utilized in this invention are the type disclosed in the above-referred-to patent to Karlsson et al. No. 3,139,887. Since these rolls operate in pairs and each roll of the pair is identical, only one of the rolls will be discussed. Each roll includes a core 23 having an axis 27 and a plurality of ribs or plates 28 secured thereto and extending outwardly therefrom. The material-engaging edges 21 of said ribs or plates 28, when rotated, generate parallel cylinders that cooperate to grasp the corn stalk and pull it downwardly between the rolls 20. The material-engaging edges 21 are shown in this application to be straight, however, it should be noted that the edges could have an irregular pattern with stalk gripping projections such as the scalloped edges shown in the above-referred-to patent to Karlsson et al. No. 3,139,887. In FIGURE 3, the corn-feeding rolls 20 are shown in working engagement with a corn stalk after the stalk has been broken from the ear in the area of the lobe. As can be best seen in FIGURE 2 the working edges 21 of the stalk-feeding rolls 20 define a stalk-feeding slot 60 between adjacent rolls. Means are provided for effecting rotation of the corn-feeding rolls 20 including spur gears 25 secured to the upper portion of each core 23. The spur gears 25 of adjacent feeding rolls engage each other such that the rotation of one roll will cause the other roll to rotate in the opposite direction. A sprocket 26 is mounted on the core 23 of one of the rolls and rotary movement is supplied to both rolls through this sprocket. This is a conventional drive for corn-feeding rolls and reference may be had to the above-referred Karlsson et al. Patent No. 3,101,579, for a more complete description of this type drive.

A first stripper plate designated 31 is located around one of the feeding rolls and a second stripper plate designated 32 is located around the other corn-feeding roll 20. Since both of the stripper plates are identical in construction only one shall be described in detail. Each stripper plate includes an upper end section plate 33 having an aperture 34 that corresponds in size to a bearing surface on the bushing 12. The stripper plates 31 and 32 are mounted for rotary movement around the corn-feeding rolls by mounting the upper end section plates on the bushings 12 and holding them in place with means such as a spring clip 13. Thus, the upper end section plate 33 is mounted for rotary movement about the axis 27 of the corn-feeding roll 20. As can be best seen in FIGURE 3, the upper end section plate 33 has a peripheral edge designated 35 described about the axis 27 of the corn-feeding rolls. The peripheral edge 35 is described by an arc having a radius designated $a$ as seen in FIGURE 3. Another section of the upper end section plate has a peripheral edge designated 36. The peripheral edge 36 is described by an arc having a radius designated $b$ formed about the axis 27 of the corn-feeding rolls 20. Gear teeth are formed along the peripheral edge 36 that function as a rack 37 that cooperates with a pinion or worm gear 38.

Each of the stripper plates 31 and 32 includes a lower end section plate 53 as can be best seen in FIGURE 2. The plate 53 has an aperture 54 formed therein through which the core 23 of the corn-feeding rolls extends. The lower end section plate has a peripheral edge 55 formed by an arc having a radius $a$ taken about the axis 27. The peripheral edges 35 and 55 of the upper end section plate 33 and of the lower end section plate 53 correspond in shape and size.

A material-engaging sheet 45 having a generally concavo-convex cross section is secured at one end to the upper end section plate 33 and at the other end to the lower end section plate 55. As can be best seen in FIGURE 3 the material-engaging sheet envelops the feeding rolls 20. The material-engaging edges 46 of the sheets 45 define a material feeding slot designated 48. By simultaneously rotating the first and second stripper plates about the axis 27 the width of the material-feeding slot 48 can be adjusted to accommodate the particular conditions under which it is operating. This adjustment is made by the engagement of the worm gear 38 having righthand threads 40 and lefthand threads 41 with the upper end section plates 33.

As the pinion or worm gear 38 is rotated in a given direction the first stripper plate 31 will be rotated in one direction and the second stripper plate will be rotated in the opposite direction. It should be understood that mechanical linkages are provided so that the operator can rotate the pinion 38 from his platform to adjust the width of the material feeding slot 48. Also it should be noted that when the pinion is rotated to the desired position by the operator the engagement of the threads of the pinion with the racks 37 function to lock the first and second stripper plates in the selected position.

Weed knives 41 are secured to the bottom edges of the material-engaging sheets 45 and cooperate with the material-engaging edges 21 of the corn-feeding rolls 20 to sever any weeds that may tend to wrap or cling to the corn-feeding rolls.

Referring now to FIGURE 5 which illustrates another embodiment of applicants' invention. In this embodiment the means for positioning the stripper plates 31 and 32 is different from that already discussed. In describing this embodiment the same reference numerals will be used to identify elements that are common to both embodiments. The upper end section plates 64 are each formed with a section of gear teeth 65 that are adapted to engage each other. When rotary motion is imparted to one of the stripper plates, it transmits this motion in the opposite direction to the other stripper plate through the engaging gear teeth 65. An arm or lever 66 is connected to and extends radially outwardly from stripper plate 32 and is pivotally connected at 68 to a reciprocating link 67. Upon reciprocation of the link 67, the stripper plate 32 is rotated about bearing 12 that is in engagement with aperture 34 and the rotary motion is transmitted to the stripper plate 31 through the engaging gear teeth 65. Conventional linkage means are provided for positioning and locking plates 64 in a selected position to provide a material feeding slot 48 of a desired width.

It should be understood, of course, that the foregoing disclosure relates to only a preferred embodiment of the invention and that numerous modifications or alterations may be made therein without departing from the spirit and the scope of the invention as set forth in the appended claims.

What is claimed is:

1. A stripper plate for a corn-harvesting machine comprising a pair of end section plates, said end section plates having means for rotatably supporting them about an axis normal to said end section plates, each of said end section plates having a peripheral edge described by an arc having its center of rotation on said axis, gear teeth along one portion of one of said peripheral edges, a material-engaging sheet secured to said end section plates along another portion of said one of said peripheral edges and extending along said axis to connect said end section plates, said material-engaging sheet having a material engaging edge that is rolled downwardly about a center proximate said axis.

2. In a corn-snapping unit having a pair of aggressive stalk-feeding rolls adapted to rotate about substantially parallel axes, the improvement which comprises:
    a stripper plate overlying each of said stalk-feeding rolls;
    each stripper plate including a pair of end section plates having means for generally supporting them on each end of said stalk-feeding rolls, one of said end section plates of each pair having a peripheral edge described by an arc having its center of rotation on the axis of said stalk-feeding roll, gear teeth along said peripheral edges, a material-engaging sheet extending along said axes and connecting said end section plates, said material-engaging sheet having at least one edge rolled downwardly about a center proximate said axis,
    and worm gear means adapted to engage the gear teeth along the peripheral edges of said end section plates to rotate the stripper plates about the axis of said stalk-feeding rolls.

3. The invention as set forth in claim 2 wherein the end section plates having gear teeth along their peripheral edges are at adjacent ends of the stalk-feeding rolls;
    and said worm gear means includes a right-hand threaded portion adapted to engage one end section plate and a left-hand threaded portion adapted to engage the other end section plate such as when said worm gear means is rotated the stripper plates will rotate in opposite directions.

4. The invention as set forth in claim 3 wherein said stripper plates include trash removal knives, said knives being secured along the other edges of said material-engaging sheets such that the knife edges cooperate with the aggressive surfaces of said stalk-feeding rolls to remove trash from said rolls.

5. In a corn-picking apparatus, the combination of: a pair of generally cylindrical corn-feeding rolls spaced with respect to each other to define a stalk-feeding slot of given lateral extent;
    stalk-gripping projections affixed to said rolls, said rolls being oriented with respect to each other such that such talk-gripping projections of each roll simultaneously intersect a plane through the axes of said rolls;
    means for effecting rotation of said rolls to snap the ears from the stalks;
    a pair of stripper plates mounted for rotary movement about the axes of the rolls, each stripper plate including an elongated material-engaging sheet having a material-engaging edge and an end section plate lying in a plane normal to the axes of said rolls, said material-engaging sheets having a concavo-convex transverse cross-section such that they surround a portion of the adjacent roll, said pair of stripper plates defining between their material-engaging edges a material-feeding slot that is aligned with said stalk-feeding slot;
    means for simultaneously rotating said stripper plates about the axes of the rolls and locking them in selected positions including engaging gear teeth on the peripheral edges of said end section plates adapted to transmit rotary motion from one stripper plate to the other.

6. In a corn-picking apparatus, the combination of: a pair of generally cylindrical corn-feeding rolls spaced with respect to each other to define a stalk-feeding slot of given lateral extent;
    means for effecting rotation of said rolls to snap the ears from the stalks;
    a pair of stripper plates mounted for rotary movement about the axes of the rolls, each stripper plate including an elongated material-engaging sheet having a material-engaging edge and an end section plate lying in a plane normal to the axes of said rolls, said material-engaging sheets having a concavo-convex transverse cross-section such that they surround a portion of the adjacent roll, said pair of stripper plates defining between their material-engaging edges, a material-feeding slot that is aligned with said stalk-feeding slot;
    means for simultaneously rotating said stripper plates about the axes of the rolls and locking them in selected positions including engaging gear teeth on the peripheral edges of said end section plates adapted to transmit rotary motion from one stripper plate to the other.

7. The invention as set forth in claim 5, wherein said stripper plates include trash removal knives, said knives being secured along the other edges of said material-engaging sheets such that the knife edges cooperate with the aggressive surfaces of said stalk-feeding rolls to remove trash from said rolls.

8. The invention as set forth in claim 6, wherein said stripper plates include trash removal knives, said knives being secured along the other edges of said material-engaging sheets such that the knife edges cooperate with the aggressive surfaces of said stalk-feeding rolls to remove trash from said rolls.

References Cited by the Examiner

UNITED STATES PATENTS

| | | | |
|---|---|---|---|
| 1,056,727 | 3/1913 | Asper | 56—108 |
| 3,101,579 | 8/1963 | Karlsson et al. | 56—18 |
| 3,126,690 | 3/1964 | Keller et al. | 56—107 |

ANTONIO F. GUIDA, *Acting Primary Examiner.*